United States Patent [19]
Forster et al.

[11] Patent Number: 5,667,761
[45] Date of Patent: Sep. 16, 1997

[54] SYNTHESIS OF GAMMA CALCIUM PYROPHOSPHATE

[75] Inventors: Cheryl M. Forster, Granville, Ohio; Scott A. Meilicke, Seattle, Wash.

[73] Assignee: Osram Sylvania Inc., Danvers, Mass.

[21] Appl. No.: 717,038

[22] Filed: Sep. 20, 1996

[51] Int. Cl.$^6$ .................................................. C01B 25/42
[52] U.S. Cl. ............................................................ 423/305
[58] Field of Search ............................................. 423/305

[56] References Cited

U.S. PATENT DOCUMENTS

| | | | |
|---|---|---|---|
| 3,357,790 | 12/1967 | Saunders et al. | 423/305 |
| 3,407,035 | 10/1968 | Shen | 423/305 |
| 3,635,660 | 1/1972 | Bruce et al. | 423/305 |
| 3,636,352 | 1/1972 | Wanmaker et al. | 250/80 |
| 3,975,308 | 8/1976 | Myles | 423/305 |
| 4,721,615 | 1/1988 | Griffith et al. | 423/305 |

FOREIGN PATENT DOCUMENTS

| | | | |
|---|---|---|---|
| 140613 | 3/1980 | Germany | 423/305 |
| 1224 | of 1869 | United Kingdom | 423/305 |

*Primary Examiner*—Wayne Langel
*Attorney, Agent, or Firm*—Robert F. Clark

[57] ABSTRACT

A pure gamma calcium pyrophosphate for use in e.g., the production of calcium haloapatite fluorescent phosphor host materials, and a process for the synthesis thereof. Dicalcium orthophosphate is dissolved in a dilute solution of nitric acid in water, and spray-dried to form a calcium phosphate powder including a major phase of spherically shaped particles of dicalcium orthophosphate. The calcium phosphate powder is fired in air to convert the calcium phosphate powder to pure gamma calcium pyrophosphate. Gamma pyrophosphate will not undergo dehydration during firing of the fluorescent phosphor; thus larger quantities of phosphor can be processed in a firing vessel.

14 Claims, 2 Drawing Sheets

SYNTHESIS OF GAMMA CALCIUM PYROPHOSPHATE

BACKGROUND OF THE INVENTION

The present invention relates to calcium pyrophosphate ($Ca_2P_2O_7$) powders, and particularly to the synthesis of the pure gamma phase of calcium pyrophosphate, a starting material for calcium haloapatite fluorescent phosphor host material.

In a typical process for producing calcium haloapatite phosphor, dicalcium orthophosphate ($CaHPO_4$) powder is blended with other components (e.g., manganese carbonate ($MnCO_3$), calcium chloride ($CaCl_2$), calcium fluoride ($CaF_2$), antimony oxide ($Sb_2O_3$), or calcium carbonate ($CaCO_3$)) and fired at high temperature to form the phosphor. During firing, water is driven off from the dicalcium orthophosphate by the high reaction temperature. The quantity of powder which may be fired in each reaction vessel thus is limited by the need to accommodate the resulting water vapor within the reaction vessel.

Attempts have been made to produce calcium haloapatite phosphors by converting the dicalcium orthophosphate to calcium pyrophosphate before blending the phosphate powder with the other starting components. However, three polymorphs of calcium pyrophosphate exist, the alpha, beta, and gamma forms. The gamma phase is preferred for calcium halophosphate phosphor synthesis, because the phosphate is already in the anhydrous form and will not undergo dehydration in the reaction vessel. The beta phase can inhibit the reaction converting the calcium pyrophosphate to the desired calcium haloapatite phosphor host.

Prior to the present invention, no process had resulted in pure gamma phase calcium pyrophosphate, to provide a more desirable intermediate for the production of calcium haloapatite phosphor host. The process described herein was developed to address that need.

SUMMARY OF THE INVENTION

Accordingly, it is an object of the present invention to overcome the disadvantages of the prior art processes for production of calcium pyrophosphate for phosphor manufacture.

It is another object of the present invention to provide an efficient process for synthesizing calcium pyrophosphate in the pure gamma form.

It is another object of the invention to provide a calcium pyrophosphate powder in the form of spherical particles of pure gamma phase calcium pyrophosphate.

Accordingly, in one embodiment the invention is a process for the synthesis of gamma calcium pyrophosphate involving dissolving dicalcium orthophosphate in a solution of nitric acid in water to form a dicalcium orthophosphate solution. The dicalcium orthophosphate solution is spray-dried to form a prefired calcium phosphate powder. The prefired calcium phosphate powder is fired in an oxidizing atmosphere, at a temperature and for a time sufficient to convert the prefired calcium phosphate powder to pure gamma calcium pyrophosphate.

In another embodiment, the invention is a calcium pyrophosphate powder consisting essentially of generally spherical particles of gamma calcium pyrophosphate.

BRIEF DESCRIPTION OF THE DRAWINGS

For a better understanding of the present invention, together with other objects, features, advantages, and capabilities thereof, reference is made to the following Description and appended Claims, together with the Drawing in which:

DETAILED DESCRIPTION OF THE PREFERRED EMBODIMENTS

The process described herein is a spray-dry process for producing a pure gamma phase calcium pyrophosphate. Dicalcium halophosphate, in a form sufficiently pure for the efficient production of calcium haloapatite phosphor, is dissolved in acid and spray-dried to produce particles which are generally spherical in shape. The amount of acid solution added is at least sufficient to dissolve the phosphor powder. It has been found that, in order to produce the pure gamma phase, the acid must be a nitric acid solution. Preferably, the final nitric acid solution is an aqueous solution of about 1.5–3.5 moles/liter nitric acid. This acid strength protects the spray drier surfaces from erosion and helps prevent agglomeration of the primary particles of the spray-dried phosphor. The spray-dried particles typically are a mixture of a major component of dicalcium orthophosphate ($CaHPO_4$) with a monocalcium orthophosphate ($Ca(H_2PO_4)_2.H_2O$) minor component.

The spherical orthophosphate particles are fired at a temperature and for a time sufficient to produce a pure gamma phase calcium pyrophosphate powder, which is also in the form of spherical particles. Typically, the temperature required is about 500° C.–1100° C., preferably about 600° C.–800° C., most preferably about 650° C.–750° C.; and the time, about 1–10 hours, preferably about 2–6 hours, most preferably about 3.5–4.5 hours, depending on the firing temperature. For phosphor manufacture, the preferred particle size (average effective diameter) for the fired powder is less than about 10 μm.

The gamma calcium pyrophosphate may then be substituted for the water vapor-producing dicalcium orthophosphate in the component mixture for the larger-scale production of calcium haloapatite phosphor host fluorescent material.

The following description of various illustrated processes is presented to enable those skilled in the art to more clearly understand and practice the present invention. These examples should not be considered as a limitation upon the scope of the present invention, but merely as being illustrative and representative thereof.

EXAMPLES

A dicalcium phosphate suspension was made by stirring 2 Kg dicalcium orthophosphate ($CaHPO_4$, monetite) powder into 7 liters of deionized water. An amount of 1.55 liters of reagent grade (68%) nitric acid ($HNO_3$) was added slowly to the mixture to dissolve the dicalcium orthophosphate. The dicalcium orthophosphate mixture was then spray-dried by spraying it as a fine mist into the atomizer chamber of a Niro rotary atomizer (manufactured by Niro, a Danish manufacturer) using a liquid transfer pump with the inlet temperature set at 320° C. and the outlet temperature varying between 107° and 125° C. The spray-dried, prefired powder was collected in a cyclone system.

Figure 1:
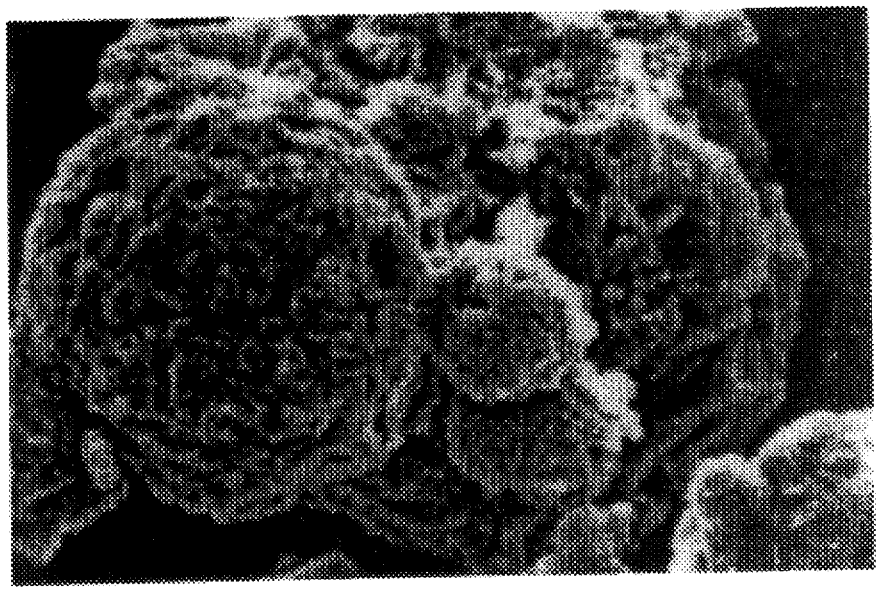
FIG. 1 is a microphotograph of a prefired powder produced during the process in accordance with one embodiment of the present invention, showing a particle morphology of spherical particles exhibiting irregular dimpled surfaces.

Analysis by x-ray diffraction indicated that the spray-dried powder included a major phase of spherically shaped particles of dicalcium orthophosphate ($CaHPO_4$) and a minor phase of spherically shaped monocalcium orthophosphate ($Ca(H_2PO_4)_2 \cdot H_2O$). The particle morphology for this prefired powder was spherical particles exhibiting irregular dimpled surfaces, as shown in FIG. 1.

Figure 2:
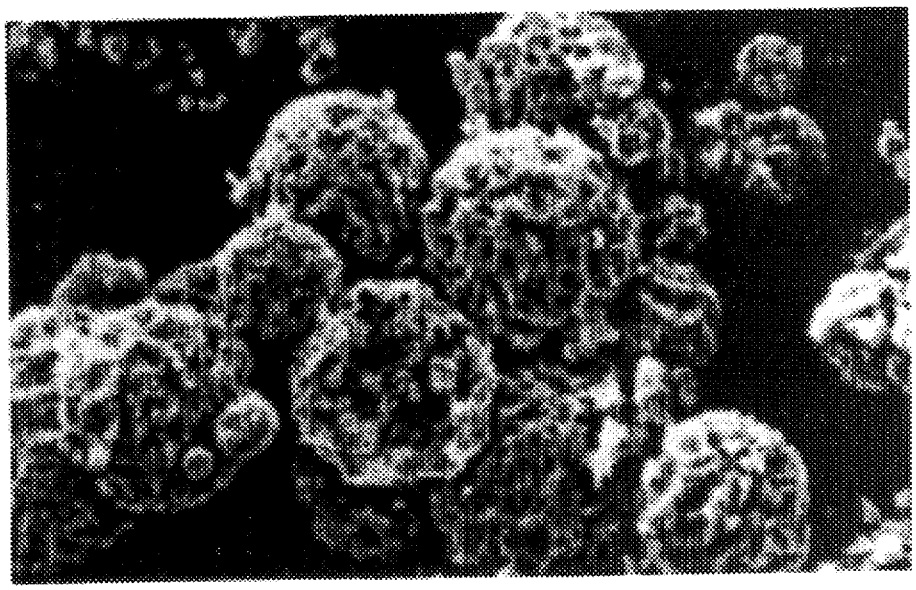
FIG. 2 is a microphotograph of the gamma calcium pyrophosphate powder in accordance with one embodiment of the present invention, showing a particle morphology similar to that shown in FIG. 1, i.e., spherical particles exhibiting irregular dimpled surfaces.
Figure 3:
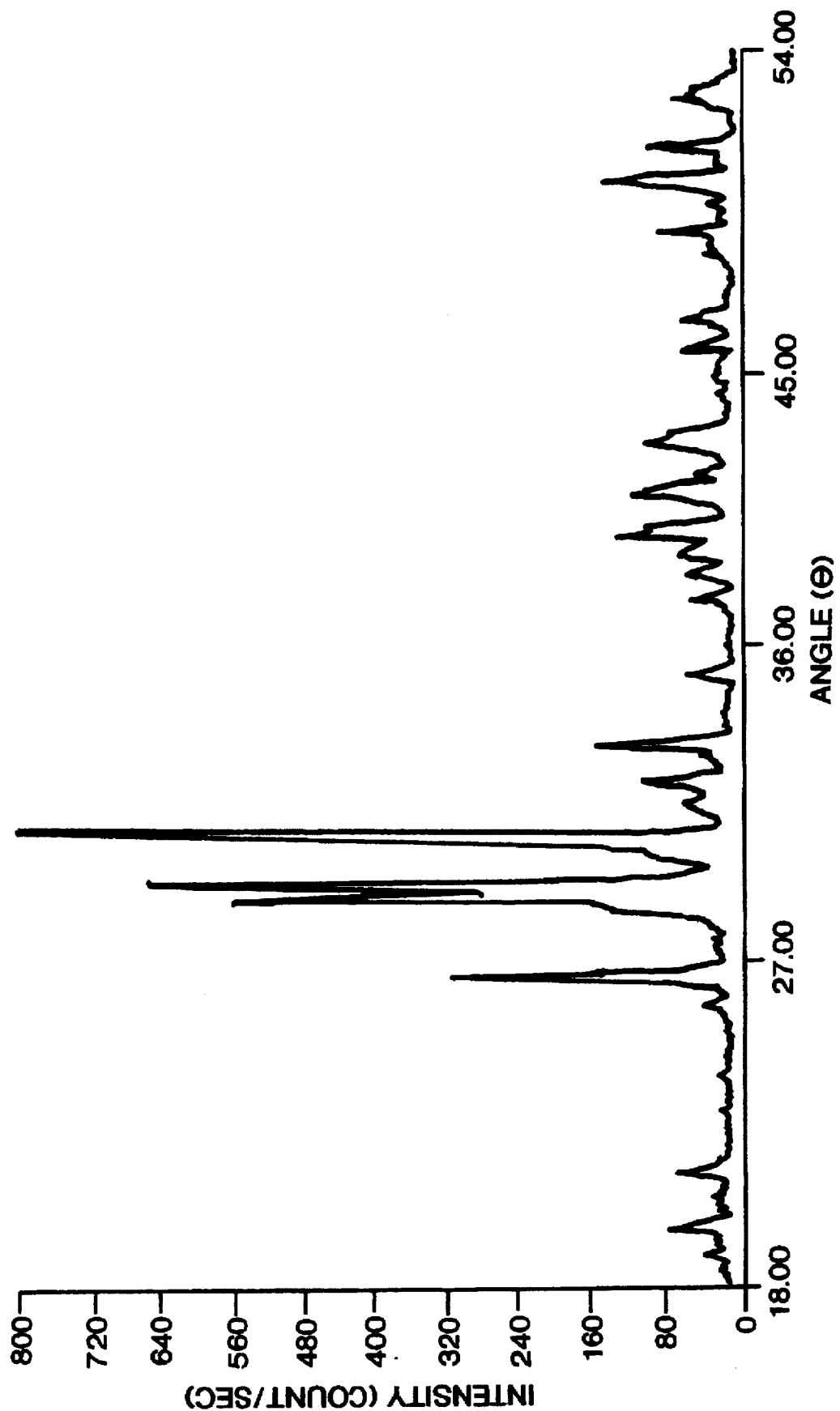
FIG. 3 is a graphical representation of the X-ray diffraction pattern produced by the gamma calcium pyrophosphate powder of FIG. 2.

The mixed mono- and dicalcium orthophosphate powder was then fired in alumina crucibles in an oxidizing atmosphere (air) at 700° C. for about 4 hours. Examination of the fired powder by scanning electron microscope, after sonification, shows a particle morphology, shown in FIG. 2, of spherical particles exhibiting irregular dimpled surfaces, similar to that shown in FIG. 1 for the spray-dried powder before firing. The x-ray diffraction pattern for the fired powder, shown in FIG. 3, shows that the mixed phosphate powder was converted to pure gamma phase calcium pyrophosphate.

Similar runs were made varying the temperature between about 600° C. and about 800° C. and varying the time between about 2 hours and about 6 hours. All of the times and temperatures tested resulted in the production of a pure gamma phase calcium pyrophosphate.

The invention described herein presents to the art a novel, improved process for synthesizing pure gamma calcium pyrophosphate for, e.g., the production of calcium haloapatite fluorescent phosphor host materials. The process efficiently and economically produces the gamma form of the pyrophosphate without contamination by the alpha and beta forms.

While there has been shown and described what are at present considered the preferred embodiments of the invention, it will be apparent to those skilled in the art that modifications and changes can be made therein without departing from the scope of the present invention as defined by the appended claims.

We claim:

1. A process for the synthesis of gamma calcium pyrophosphate comprising:

dissolving dicalcium orthophosphate in a solution of nitric acid in water to form a dicalcium orthophosphate solution;

spray-drying said dicalcium orthophosphate solution to form a prefired calcium phosphate powder;

firing said prefired calcium phosphate powder in an oxidizing atmosphere, at a temperature and for a time sufficient to convert said prefired calcium phosphate powder to pure gamma calcium pyrophosphate.

2. A method in accordance with claim 1 wherein said nitric acid solution is a dilute solution of nitric acid in water.

3. A method in accordance with claim 2 wherein the strength of said dilute nitric acid solution is about 1.5–3.5 moles/liter.

4. A method in accordance with claim 1 wherein said dicalcium orthophosphate solution is spray-dried at about 100°–350° C.

5. A method in accordance with claim 1 wherein said prefired calcium phosphate powder includes a major phase of spherically shaped particles of dicalcium orthophosphate.

6. A process in accordance with claim 1 wherein said oxidizing atmosphere is air.

7. A process in accordance with claim 1 wherein said calcium phosphate powder is fired at a temperature of about 600° C.–800° C.

8. A process in accordance with claim 7 wherein said calcium phosphate powder is fired for a time of about 2–6 hours.

9. A process in accordance with claim 7 wherein said firing temperature is about 650° C.–750° C.

10. A process in accordance with claim 9 wherein said time is about 3.5–4.5 hours.

11. A process in accordance with claim 10 wherein said firing comprises firing said calcium phosphate powder in air at about 700° C. for about 4 hours.

12. A process in accordance with claim 1 further comprising deagglomerating said gamma calcium pyrophosphate powder.

13. A calcium pyrophosphate powder consisting essentially of gamma calcium pyrophosphate, wherein said powder is in the form of generally spherical particles.

14. A calcium pyrophosphate powder in accordance with claim 13 wherein the average effective diameter of said particles is less than about 10 μm.

* * * * *